United States Patent
Sen et al.

(10) Patent No.: US 12,277,123 B1
(45) Date of Patent: Apr. 15, 2025

(54) SYSTEM AND METHOD FOR PERFORMING QUERY OPERATIONS ON RUN LENGTH ENCODED DATA

(71) Applicant: Microsoft Technology Licensing, LLC, Redmond, WA (US)

(72) Inventors: Rathijit Sen, Redmond, WA (US); Zezhou Huang, New York, NY (US); Matteo Interlandi, Torrance, CA (US); Marius Dumitru, Sammamish, WA (US); Krystian Sakowski, Washington, DC (US); Carlo Aldo Curino, Woodinville, WA (US); Hans C. Lehnert Merino, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/497,598

(22) Filed: Oct. 30, 2023

(51) Int. Cl.
*G06F 16/2455* (2019.01)
*G06F 16/2453* (2019.01)

(52) U.S. Cl.
CPC .. *G06F 16/24556* (2019.01); *G06F 16/24537* (2019.01); *G06F 16/24542* (2019.01)

(58) Field of Classification Search
CPC ......... G06F 16/24556; G06F 16/24537; G06F 16/24542
See application file for complete search history.

(56) References Cited

U.S. PATENT DOCUMENTS

| | | | | |
|---|---|---|---|---|
| 9,171,041 | B1* | 10/2015 | Narayanan | G06F 16/24542 |
| 9,430,524 | B1* | 8/2016 | Narayanan | G06F 16/2456 |
| 10,901,948 | B2* | 1/2021 | Ackerman | G06F 16/1744 |
| 11,899,662 | B1* | 2/2024 | Prasad | G06F 16/24556 |
| 2010/0088309 | A1 | 4/2010 | Petculescu | |
| 2012/0117067 | A1* | 5/2012 | Yakubovich | G06F 16/2246 |
| | | | | 707/E17.014 |
| 2016/0246811 | A1* | 8/2016 | Ackerman | G06F 16/1744 |
| 2021/0042280 | A1 | 2/2021 | Sharma | |

OTHER PUBLICATIONS

"Nvidia A100 Tensor Core GPU Unprecedented Acceleration at Every Scale", Retrieved From: https://www.nvidia.com/content/dam/en-zz/Solutions/Data-Center/a100/pdf/nvidia-a100-datasheet-nvidia-US-2188504-web.pdf, Jun. 20, 2020, pp. 1-3.

"Nvidia-Smi Documentation", Retrieved From: https://developer.download.nvidia.com/compute/DCGM/docs/nvidia-smi-367.38.pdf, Jul. 26, 2016, pp. 1-34.

(Continued)

*Primary Examiner* — Jared M Bibbee
(74) *Attorney, Agent, or Firm* — Brian J. Colandreo; Heath M. Sargeant; Holland & Knight LLP

(57) ABSTRACT

A method, computer program product, and computing system for processing query operations on run length encoding (RLE), data in a parallel processing computing system. Data for query execution is received at a parallel processing computing system, at least a portion of the data being compressed according to RLE, thereby forming RLE data; and a query operation is executed on the RLE data without performing a decompression operation on the RLE data.

17 Claims, 12 Drawing Sheets

(56) References Cited

OTHER PUBLICATIONS

Abadi, et al., "Integrating compression and execution in column-oriented database systems", In Proceedings of ACM SIGMOD international conference on Management of data, Jun. 27, 2006, pp. 671-682.

Abadi, et al., "The design and implementation of modern column-oriented database systems", In Jornal of Foundations and Trends in Databases, vol. 5, Issue 3, Dec. 3, 2013, pp. 1-27.

Asada, et al., "Share the Tensor Tea: How Databases Can Leverage the Machine Learning Ecosystem", In Proceedings of the VLDB Endowment, vol. 15, Issue 12, Aug. 12, 2022, pp. 3598-3601.

Coelho, et al., "What is V-Order?", Retrieved From: https://learn.microsoft.com/en-us/fabric/data-engineering/delta-optimization-and-v-order?tabs=sparksql, Aug. 8, 2023, 7 Pages.

Damme, et al., "Morphstore: Analytical query engine with a holistic compression-enabled processing model", In Repository of arXiv:2004.09350v1, Apr. 20, 2020, pp. 1-26.

Fang, et al., "Database compression on graphics processors", In Proceedings of the VLDB Endowment, vol. 3, Issue 1-2, Sep. 1, 2010, pp. pp 670-680.

Gandhi, et al., "The Tensor Data Platform: Towards an AI-centric Database System", In Conference on Innovative Data Systems Research, Nov. 4, 2022, 7 Pages.

Ghita, Bogdan, "Public BI benchmark", Retrieved From: https://github.com/cwida/public_bi_benchmark, Apr. 5, 2019, 3 Pages.

He, et al., "Query Processing on Tensor Computation Runtimes", In Proceedings of the VLDB Endowment, vol. 15, Issue 11, Jul. 1, 2022, pp. 2811-2825.

Jiang, et al., "Good to the Last Bit: Data-Driven Encoding with CodecDB", In Proceedings of the International Conference on Management of Data, Jun. 9, 2021, pp. 843-856.

Lee, et al., "Joins on Encoded and Partitioned Data", IN Proceedings of the VLDB Endowment, vol. 7, Issue 13, Sep. 1, 2014, pp. 1355-1366.

Li, et al., "HippogriffDB: Balancing I/O and GPU Bandwidth in Big Data Analytics", In Proceedings of the VLDB Endowment, vol. 9, Issue 14, Oct. 1, 2016, pp. 1647-1658.

Malpica, William, "BlazingSQL", Retrieved from: https://github.com/BlazingDB/blazingsql, Oct. 1, 2021, 8 Pages.

Paszke, et al., "Pytorch: an Imperative Style, High-Performance Deep Learning Library", In Proceedings of International Conference on Neural Information Processing Systems, Dec. 8, 2019, pp. 1-12.

Rosenfeld, et al., "Query Processing on Heterogeneous CPU/GPU Systems", In Proceedings of the ACM Computing Surveys, vol. 55, Issue 1, Jan. 2022, pp. 1-38.

Shanbhag, et al., "A Study of the Fundamental Performance Characteristics of GPUs and CPUs for Database Analytics", In Proceedings of the ACM SIGMOD International Conference on Management of Data, Jun. 14, 2020, pp. 1617-1632.

Shanbhag, et al., "Tile-Based Lightweight Integer Compression in GPU", In Proceedings of the International Conference on Management of Data, Jun. 10, 2022, pp. 1390-1403.

Shen, Jian, "AresDB", Retrieved From: https://github.com/uber/aresdb, Oct. 11, 2019, 4 Pages.

Sitaridi, Evangelia, "GPU-acceleration of in-memory data analytics", In Publication of Columbia University, 2016, pp. 1-177.

Suh, et al., "A Comprehensive Empirical Study of Query Performance Across GPU DBMSes", In Proceedings of the ACM on Measurement and Analysis of Computing Systems, vol. 6, Issue 1, Feb. 28, 2022, pp. 1-29.

Vogelsgesang, et al., "Get Real: How Benchmarks Fail to Represent the Real World", In Proceedings of the Workshop on Testing Database Systems, Jun. 15, 2018, 6 Pages.

Zhang, et al., "Query Processing on Gaming Consoles", In Proceedings of the 19th International Workshop on Data Management on New Hardware, Jun. 18, 2023, pp. 86-88.

International Search Report and Written Opinion received for PCT Application No. PCT/US2024/049690, Jan. 22, 2025, 13 pages.

\* cited by examiner

Input:

RLE for Group-by value | range
1 | [1 – 10]
2 | [21 – 30]
1 | [41 – 50]

502

RLE for Aggregation value | range
3 | [6 – 45]

504

Solution:

range intersection group-by value | range | agg value 510
1 | [6 – 10] | 3
2 | [21 – 30] | 3
1 | [41 – 45] | 3

508 product sum 512:
512a: 15
512b: 30
512c: 15 scatter sum 514:
514a: 30
514b: 30

Output:

506

Group-by 516: 1, 2

Sum 518: 30, 30

FIG. 11

SYSTEM AND METHOD FOR PERFORMING QUERY OPERATIONS ON RUN LENGTH ENCODED DATA

BACKGROUND

Graphics Processing Units (GPUs) are highly parallel processors designed to handle thousands of tasks simultaneously. This makes them particularly well-suited for tasks that can be parallelized, such as graphics rendering, scientific simulations, and certain types of machine learning computations. GPUs have become crucial in the field of deep learning and artificial intelligence (AI). Many deep learning frameworks leverage the parallel processing capabilities of GPUs to accelerate training of neural networks. GPUs are preferred over Central Processing Units (CPUs) in certain circumstances because of their parallel processing capabilities, in which complex tasks can be broken down into smaller, more manageable parts that can be processed concurrently, whereas CPUs have a more general-purpose architecture, making them versatile for a wide range of tasks but potentially less efficient for highly parallel computations.

The device memory on GPUs is quite limited compared to CPUs, which in turn limits the data size that can be processed concurrently on GPUs. Further, when data that is to have queries operated thereon is transmitted from a CPU to a GPU for processing, the transmission is typically done over a PCIe bus which has limited bandwidth and can be a bottleneck in the transmission between the CPU and GPU. These restrictions can limit the amount of data that can be processed in a GPU performing query operations on large data sets.

BRIEF DESCRIPTION OF THE DRAWINGS

FIG. 11 is a depiction of execution of a Group-by function in accordance with an implementation of the disclosure;

Like reference symbols in the various drawings indicate like elements.

DETAILED DESCRIPTION

As will be discussed in greater detail below, implementations of the present disclosure are directed to accelerating query operations on compressed data in a GPU. However, it will be understood that implementations are also applicable for operation on compute backends that support massively parallel processing, e.g., GPUs, tensor processors, CPUs that have hundreds of cores or even many tens of cores, etc. As discussed below, data on which query operations are to be executed are compressed prior to being transmitted to the GPU. In an implementation of the disclosure, data is compressed using Run Length Encoding (RLE). Due to its high compression ratio, RLE data is smaller in size than the original representation, which makes the processing faster in addition to saving space. This helps to alleviate the PCIe bottleneck described above, which helps to speed up processing. Further, queries are performed on the data while it remains in the compressed state. Since the data does not need to be decompressed prior to a query operation, the GPU is able to process larger data sets than would be possible given the memory constraints of the GPU if the data was required to be decompressed prior to being processed.

Structured Query Language (SQL) is a domain-specific language used to manage and manipulate relational databases. SQL is widely used for interacting with relational databases, and its syntax is standardized, although specific database management systems (DBMS) might have variations.

In an implementation of the disclosure, data is compressed using Run Length Encoding (RLE). RLE is a form of data compression where sequences of identical elements (runs) are replaced with the single element and either a count of how many times it is repeated or the start and end position in the run of the element. This technique is often used to reduce the size of data with repeated patterns and is particularly effective when there are long sequences of identical values. By using RLE to compress data, implementations of the disclosure are able to process larger data sets at a faster rate than would previously be able to be processed.

Figure 1:
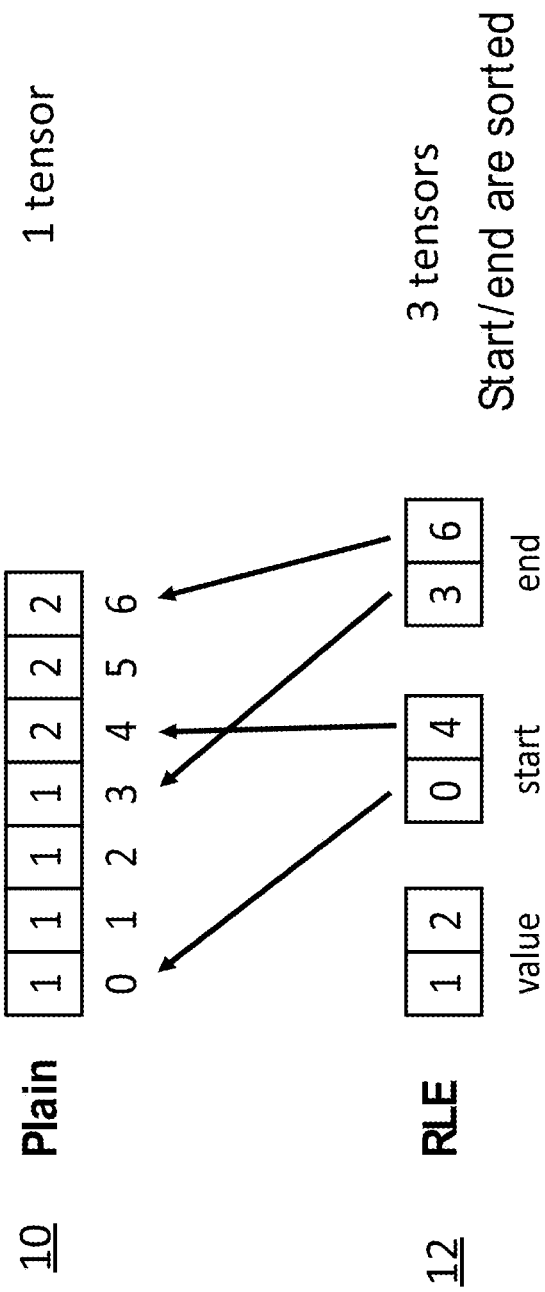
FIG. 1 is a diagram showing conversion of a plain, uncompressed data run into an RLE data run.

FIG. 1 shows examples of a query data run in its uncompressed "plain" form at 10 and the same data run compressed in RLE form at 12. As shown at 10, the data run includes 7 positions (0-6) in a tensor in which the value "1" occupies positions 0 through 3 and the value "2" occupies positions 4 through 6. A tensor is an array of values or a vector that can also be annotated with other properties such as a device on which the tensor is allocated. While examples of tensors discussed herein are one-dimensional, it will be understood that multi-dimensional tensors may be processed in the described implementations. When compressed using Run Length Encoding, as shown at 12, repeating values are represented in a single value position in a "value" tensor and the start and end positions are represented in a "start" tensor and an "end" tensor, respectively. As shown at 12, the first position of the value tensor includes value "1", the first position of the start tensor includes position "0", which is the position at which the value "1" starts, and the first position of the end tensor includes position "3", which is the position at which the value "1" ends. This represents that the value "1" occupies the run starting at position "0" and ending at position "3". Likewise, the second position of the value tensor includes value "2", the second position of the start tensor includes position "4", which is the position at which the value "2" starts, and the second position of the end tensor includes position "6", which is the position at which the value "2" ends. This represents that the value "2" occupies the run starting at position "4" and ending at position "6".

In order to enable efficient operation of the GPU, the preference is to convert the data into as compressed a form as possible. However, in some instances, simply following a compression scheme, such as RLE, without considering the actual values being compressed can result in a data run that is computationally more expensive than is necessary. For instance, if a run of data includes many consecutive non-repeating values, compressing with RLE will not result in a memory or speed advantage for that portion of the run. Examples of ways to convert such data into a more computationally efficient format are described below.

Figure 2:
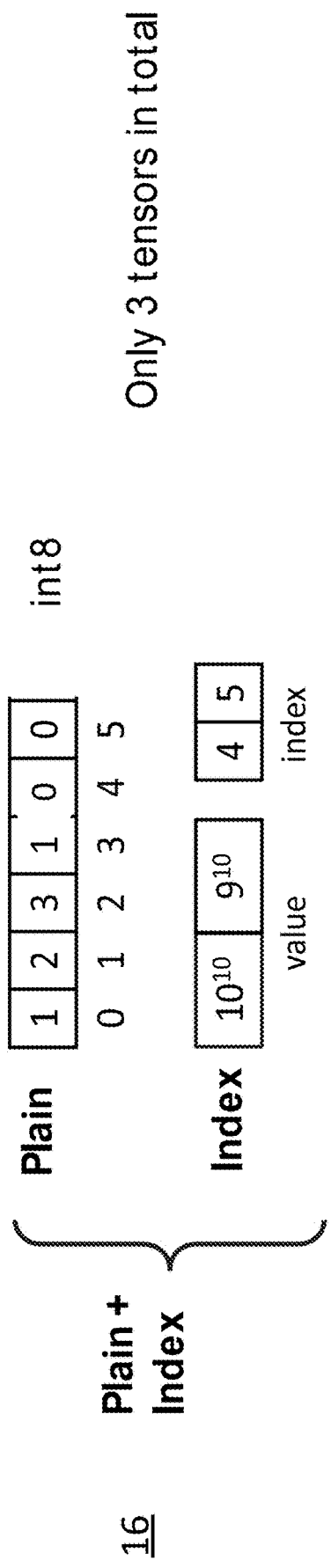
FIG. 2 is a diagram showing conversion of a plain, uncompressed data run into a hybrid plain/index data run.

FIG. 2 shows examples of a query data run in its uncompressed plain form at 14 and the same data run in a hybrid plain and index form at 16. As shown at 14, the data run includes 6 positions (0-5) in a tensor in which the value "1" occupies position 0, the value "2" occupies position 1, the value "3" occupies position 2, the value "1" occupies position 3, the value "1010" occupies position 4, and the value "910" occupies position 5. Given the very large values of the data in positions 4 and 5 (referred to as "outliers," given their disproportionately larger sizes), the entire run requires a 64-bit integer (int64), which will increase the processing overhead (increased memory and processing time) when the query is to be executed.

A hybrid representation of the plain form data run 14 is shown at 16. In this representation, the lower values "1", "2", "3", and "1" remain in the plain form in positions 0, 1, 2, and 3. This enables that run to require only a 8-bit integer. The values previously in positions 4 and 5 are stored in index form, which includes a value tensor and an index tensor. As shown, the first position of the value tensor includes value "1010" and the second position of the value tensor includes value "910". The first position of the index tensor includes position 4 and the second position of the index tensor includes position 5. This corresponds to the positions of each of the values in the original plain data run 14. The plain and index form 16 includes 3 tensors, which reduces the computational overhead compared to the plain form 14.

Figure 3:
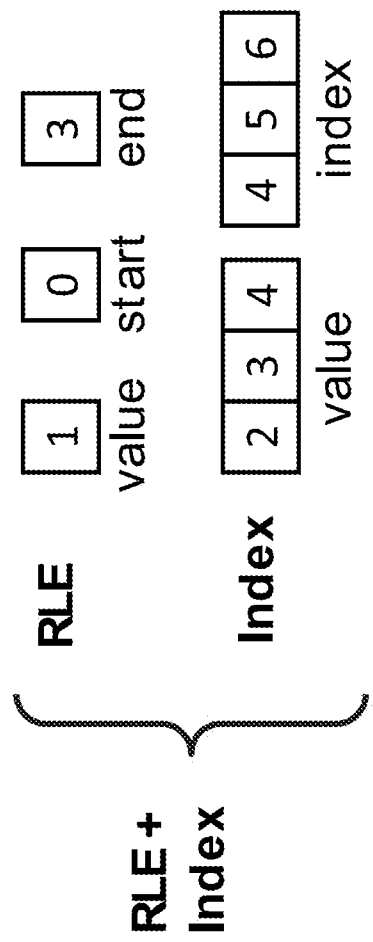
FIG. 3 is a diagram showing conversion of a plain, uncompressed data run into a hybrid RLE/index data run.

FIG. 3 shows examples of a query data run in its uncompressed plain form at 18 and the same data run in a hybrid RLE and index form at 20. As shown at 18, the data run includes 7 positions (0-6) in a tensor in which the value "1" occupies positions 0 through 3, the value "2" occupies position 4, the value "3" occupies position 5, and the value "4" occupies position 6.

A hybrid representation of the plain form data run 18 is shown at 20. When compressed using Run Length Encoding, as shown at 20, repeating values are represented in a single value position in a "value" tensor and the start and end positions are represented in a "start" tensor and an "end" tensor, respectively. In this instance, however, only the value "1" in positions 0-3 is repeated, while positions 4, 5, and 6 include different values. Since only the value "1" repeats in this data run, only that repetitive sequence is compressed with RLE, because encoding a single, non-repeating value will require more memory (value, start, and end tensors) than encoding by index, which only requires the value and position. As shown at 20, the single position of the RLE value tensor includes value "1", the single position of the start tensor includes position 0, which is the position at which the value "1" starts, and the single position of the end tensor includes position 3, which is the position at which the value "1" ends. This represents that the value "1" occupies the run starting at position 0 and ending at position 3. The values "2", "3", and "4" are indexed, such that the value "2" is indexed to position 4, the value "3" is indexed to position 5, and the value "4" is indexed to position 6.

Figure 4:
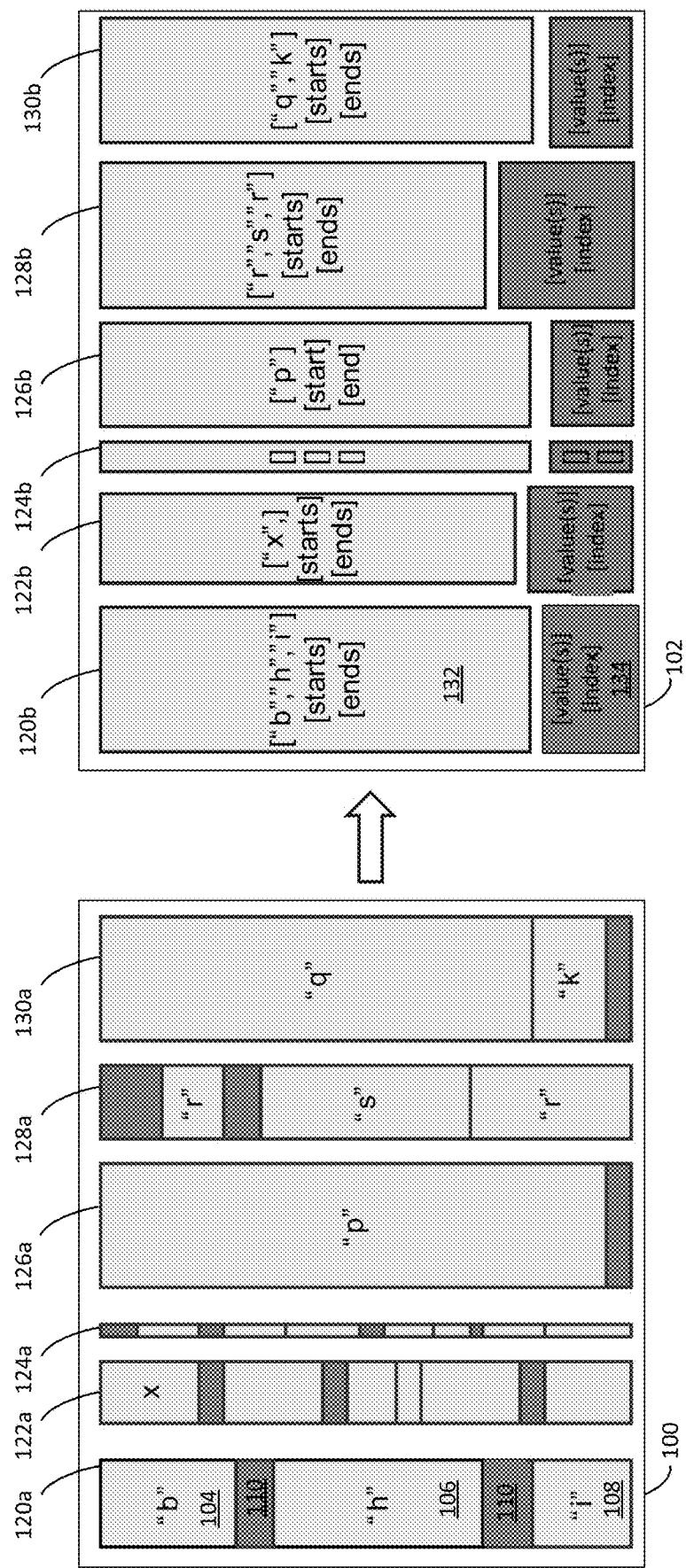
FIG. 4 is a graphical representation showing conversion of a number of a plain, uncompressed data runs into a corresponding number of hybrid RLE/index data runs.

Formulation of the RLE and Index hybrid encoding from plain data described with reference to FIG. 3 is depicted graphically in FIG. 4. Box 100 includes a plurality of data columns 120a, 122a, 124a, 126a, 128a, and 130a. In each column, the light grey box indicates a number of repetitions of a single value and the dark grey boxes each indicate one or more single instances of a non-repetetive value. As shown in column 120a, box 104 represents a number of repeating value "b", box 106 represents a number of repeating value "h", and box 108 represents a number of repeating value "i". Boxes 110 each represent either a single instance of a value or a plurality of single instances of different values. The light grey and dark grey boxes in columns 122a through 130a represent similar forms of data.

Figure 5:
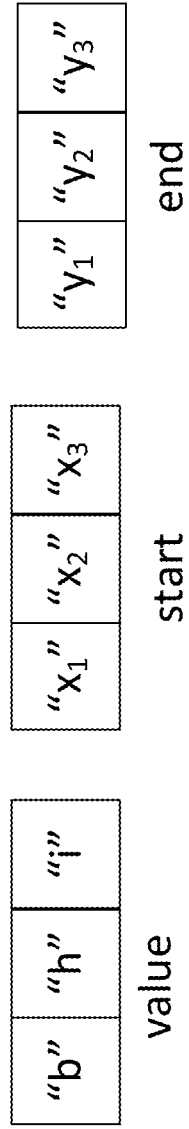
FIG. 5 is a depiction of the RLE format portion of column 120$b$ of FIG. 4.

Box 102 depicts the same data as in box 100 after it has been encoded in the hybrid RLE/index form described with reference to FIG. 3. Column 120b represents the data values of column 120a in the hybrid encoded form. Shown in box 132 of column 120b, the data represented in column 120a that includes repetitive values ("b", "h", and "i") is represented by a single representation of that value, along with the start and end positions of the repetitive run. This corresponds to the RLE representation shown in FIG. 5, in which value "b" starts at position $X_1$ and ends at position $Y_1$; value "h" starts at position $X_2$ and ends at position $Y_2$; and value "i" starts at position $X_3$ and ends at position $Y_3$.

Figure 6:
FIG. 6 is a depiction of the index format portion of column 120$b$ of FIG. 4.

Box 134 in column 120b lists the index values for non-repetitive occurring data in column 120a as shown by boxes 110. Similar to the example shown in FIG. 3, values in boxes 110 are indicated by the value "m" in the position $Z_1$ and the value "n" in the position $Z_2$, as shown in FIG. 6. Data included in columns 122a through 130a is encoded in a similar manner as the data corresponding to columns 120a and 120b.

Figure 7:
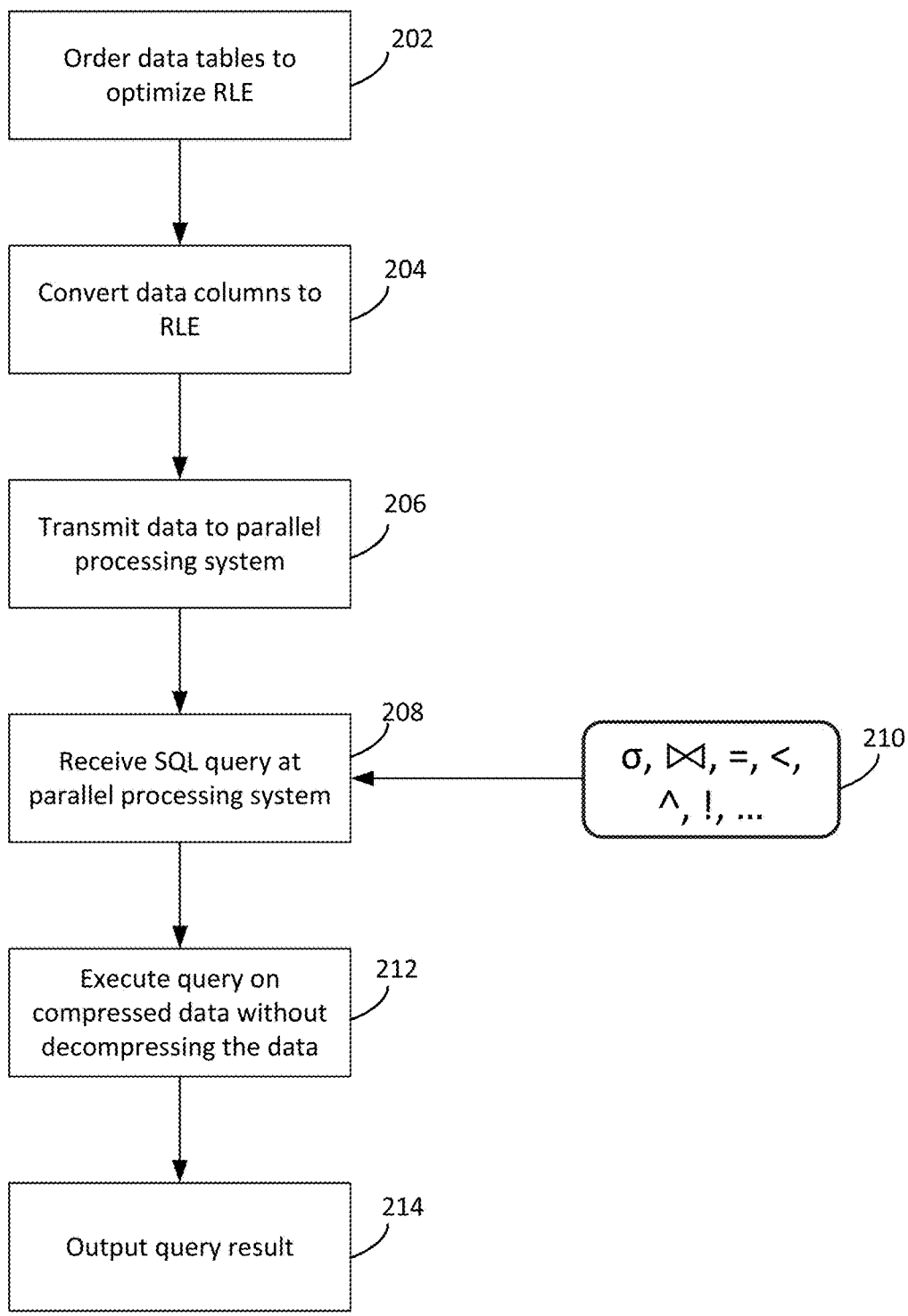
FIG. 7 is a flowchart showing a process for executing query operations on RLE data without decompressing the data.

FIG. 7 is a flow chart 200 showing a process for executing query operations according to implementations of the disclosure. In step 202, tables of data are ordered to optimize RLE encoding of the data. In an implementation, this ordering is performed in the Parquet storage file format. Parquet is a storage format that enhances the efficiency of data retrieval and analytical queries within a distributed computing environment. As a columnar storage file format, Parquet optimizes the storage and retrieval of large datasets. Its columnar structure stores data more efficiently, particularly for analytical queries that often involve accessing specific columns. Parquet supports various compression algorithms, contributing to reduced storage requirements and faster query performance. In the context of query processing, Parquet often works in tandem with distributed data processing engines that support predicate pushdown. This optimization technique allows filtering conditions to be pushed down to the storage layer before data retrieval, minimizing the amount of data processed during query execution. Parquet's compatibility with popular big data processing frameworks and its support for schema evolution make it a preferred choice for storing and querying large-scale datasets. In an alternative implementation, the reordering function may be applied to in-memory tabular data.

Selected columns of the tables are then converted to RLE tensors, 204. In an implementation, this conversion is performed at a CPU and the RLE tensors are transmitted to a parallel processing system over, for example, a PCIe bus,

206. The parallel processing system determines that the selected data columns are RLE compressed. An SQL query 210 is received by the parallel processing system 208. The query is then executed by the parallel processing system on the compressed data without decompressing the data, 212, and the query result is output from the processing system, 214. Alternatively, conversion of the columns to RLE may be performed at the parallel processing system. RLE tensors may also be created from the RLE data in Parquet without decoding the data to plain as an intermediate step first and then converting to tensors. In an implementation, not all columns are converted to RLE tensors. If the compression ratio is less than a preselected compression threshold, the data may be encoded in a plain data tensor. Further, a hybrid representation may be created if there are outliers (e.g., significantly larger data values) or consecutively non-repeating values in the data. Accordingly, a column may be loaded in Plain/RLE/Plain+Index/RLE+Index representation.

Figure 8:
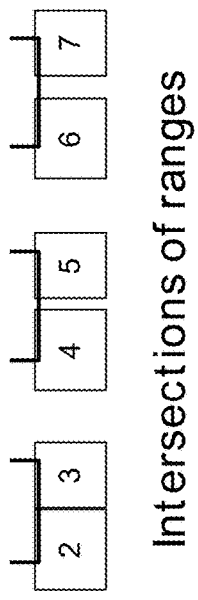
FIG. 8 is a depiction of execution of an AND function in accordance with an implementation of the disclosure.

Referring now to FIGS. 8-12, examples are shown of query operations executed in implementations of the disclosure, in which the operations are executed without decompressing RLE data. FIG. 8 depicts an example of an AND operation between 2 RLE data runs. For clarity, in this example, the RLE data runs are shown only with the start and end data for the runs, which operate as masks for the data that is to be processed in the AND operation. Input 302 is in RLE format and is a mask showing a first value starting at position 1 and ending at position 3, a second value starting at position 4 and ending at position 5, and a third value starting at position 6 and ending at position 8. The second input 304 is a mask in RLE form having a value starting at position 2 and ending at position 7. Executing an AND function with inputs 302 and 304 requires determining the position ranges that the 2 masks have in common. As shown in FIG. 8, there are 3 common ranges between inputs 302 and 304, which are the output of the query 306. Output 306 is an RLE mask including a value at a range starting at position 2 and ending at position 3, a value starting at position 4 and ending at position 5, and a value starting at position 6 and ending at position 7.

Figure 9:
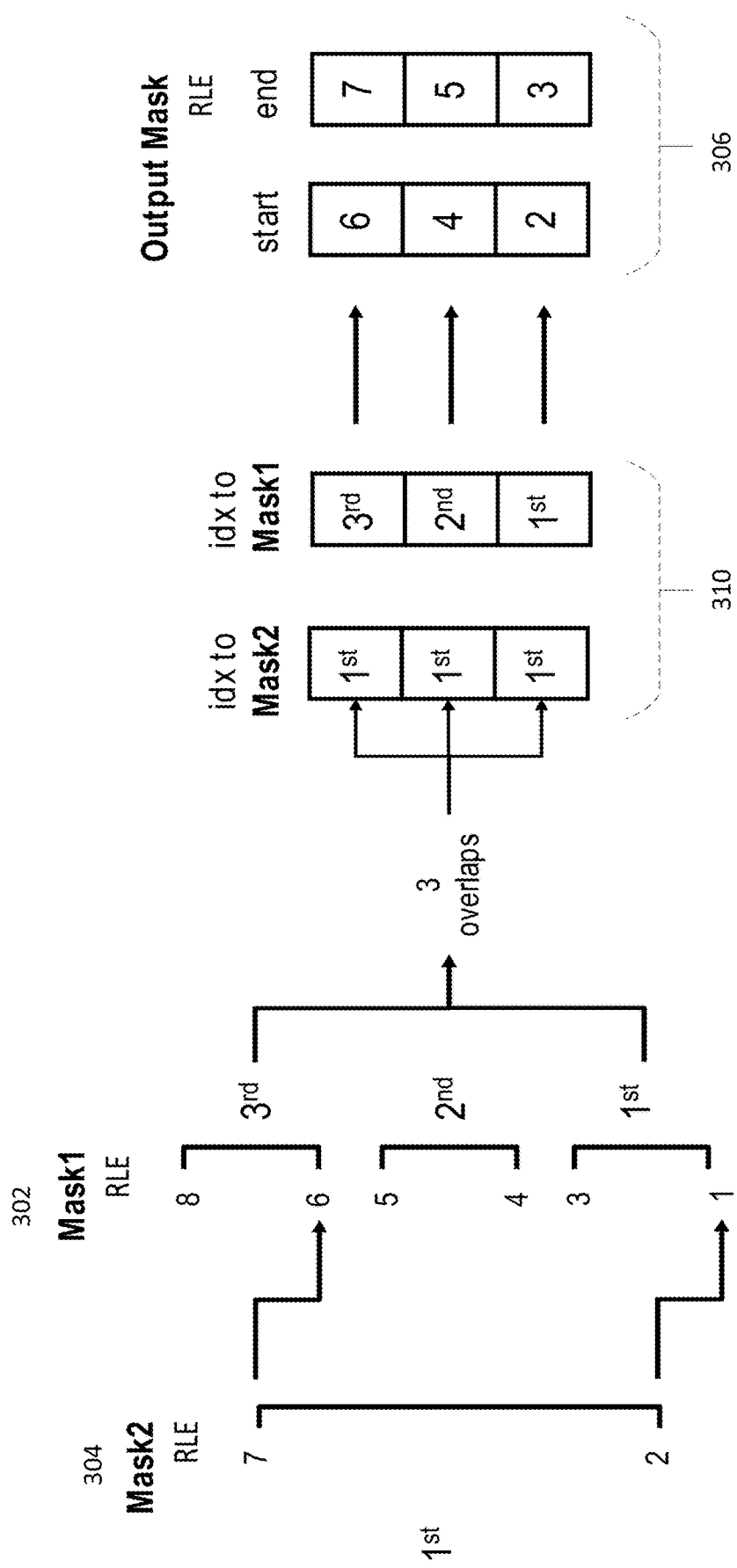
FIG. 9 is a further depiction of execution of an AND function in accordance with an implementation of the disclosure.

FIG. 9 depicts specific steps involved in determining the output mask 306 from RLE inputs 302 and 304. First, the number of overlaps between the two sets of ranges is determined. As shown, when the first range of Mask2 304 is compared in parallel with the 3 ranges of Mask1 302, it can be determined that there are 3 overlaps between the two sets of ranges. Once the number of overlaps is determined, the start and end positions of the overlaps are calculated. As shown at 310, the first range of Mask2 304 is compared to each of the 3 ranges of Mask1 302. With the first range of Mask2 spanning positions 2 through 7 and the first range of Mask1 spanning positions 1 through 3, the first overlap spans from position 2 to position 3. With the first range of Mask2 spanning positions 2 through 7 and the second range of Mask1 spanning positions 4 to 5, the second overlap spans from position 4 to position 5. With the first range of Mask2 spanning positions 2 through 7 and the third range of Mask1 spanning positions 6 through 8, the third overlap spans from position 6 to position 7. The resulting output mask is shown at 306.

In another example, an intersect operation between two RLE tensors can be done similarly. The intersect operation can be used to convert two input RLE tensors (that can have different number of runs and/or different start and end positions of runs) into two output RLE tensors that have the same number of runs and aligned at the same start and end positions. For example, if column1 is represented by values: ['a', 'b'], starts: [1, 6], ends [5, 10] and column2 is represented by values: [2.5, 10, 13.7], starts: [1, 3, 8], ends [2, 7, 10], then column1 intersect column2 would have two outputs in the result: (1) the first output, corresponding to the first column, would be represented by values: ['a', 'a', 'b', 'b'], starts: [1, 3, 6, 8], ends: [2, 5, 7, 10] and (2) the second output, corresponding to the second column, would be represented by values: [2.5, 10, 10, 13.7], starts: [1, 3, 6, 8], ends: [2, 5, 7, 10]. The intersect operation can be used as an intermediate step for many operations since the aligned runs in the intermediate results allow operations on the RLE data without needing to decompress it.

Figure 10:
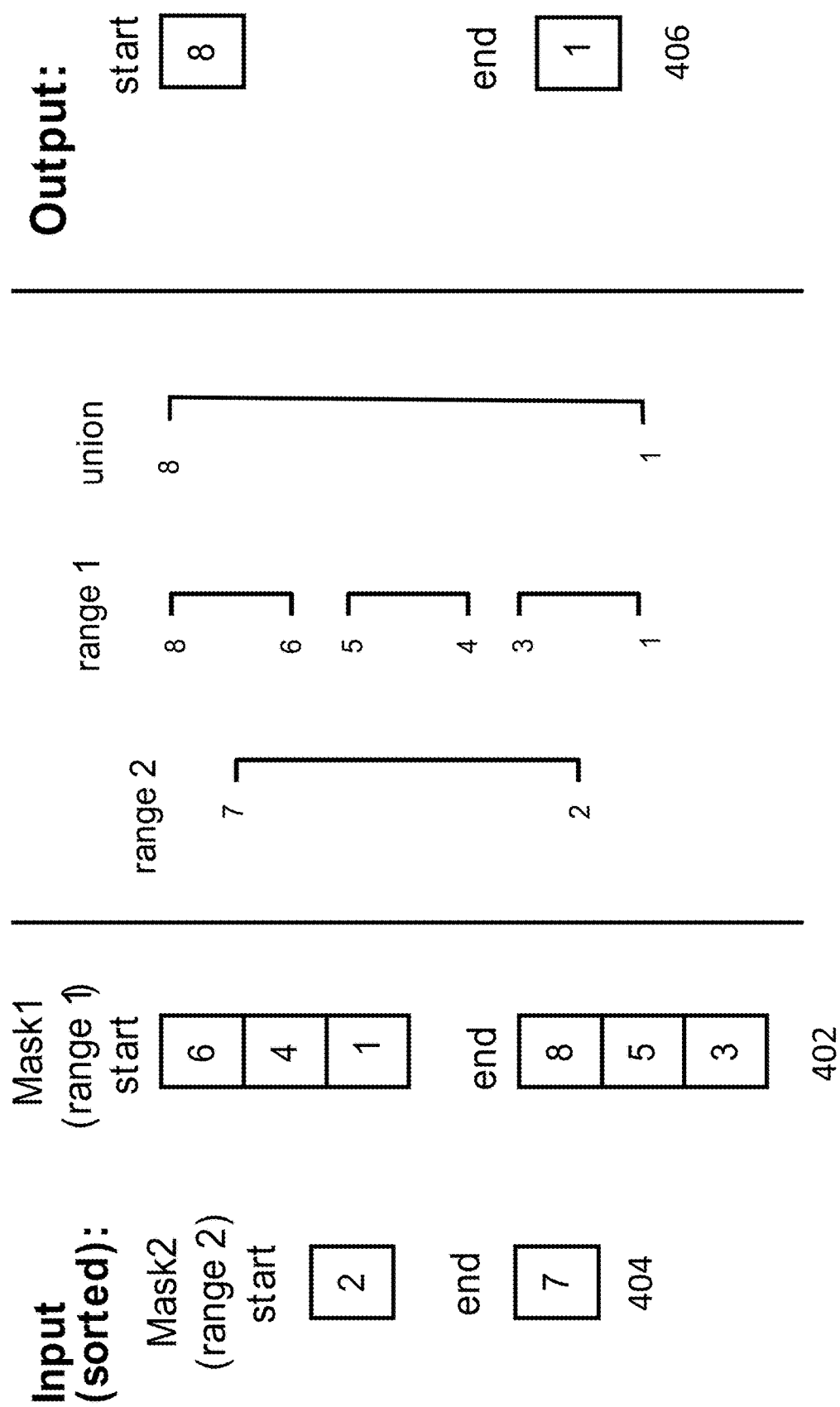
FIG. 10 is a depiction of execution of an OR function in accordance with an implementation of the disclosure.

FIG. 10 depicts specific steps involved in determining the output 406 based on an OR operation between RLE inputs 402 and 404. Range 1 of Mask1 402 includes a first value occupying positions 1 through 3, a second value occupying positions 4 and 5, and a third value occupying positions 6 through 8. Range 2 of Mask2 404 includes a first value occupying positions 2 through 7. The OR operation on inputs 402 and 404 results in the union of both ranges, which is the output 406 that includes values from the first position through the eighth position.

FIG. 11 depicts specific steps involved in determining a Group-by aggregation output 506 based on an RLE Group-by input 502 and RLE Aggregate input 504. Group-by input 502 includes value "1" in positions 1 through 10, value "2" in positions 21 through 30, and value "1" in positions 41 through 50. Aggregation input 504 includes value "3" in positions 4 through 45. While this aggregation example is a sum function, other aggregation functions may be performed, e.g., min, max, count, average, and others. Further, while this example shows a single Group-By column and a single Aggregation column, it will be understood that similar functions that include multiple columns for one or more inputs are within the scope of this disclosure.

In executing the operation, the intersection of the Group-by range and the Aggregation range is first determined. As shown at 508, the range intersection includes value "1" from positions 6 through 10, value "2" from positions 21 through 30, and value "1" from positions 41 through 45. With the Aggregation value 510 of "3" for each range, the product sum 512 is determined by multiplying the value "3" by the number of positions in each range. Accordingly, sum 512a of "15" results from the Aggregation value of "3" multiplied by the number of positions (5) in the range of 6-10; sum 512b of "30" results from the Aggregation value of "3" multiplied by the number of positions (10) in the range of 21-30; and sum 512c of "15" results from the Aggregation value of "3" multiplied by the number of positions (5) in the range of 41-45. With these values, the scatter sum 514 is determined by adding the product sums corresponding to each Group-by value. Therefore, product sums 512a and 512c, which correspond to Group-by value "1", is 30, and product sum 514b which corresponds to Group-by value "2", is 30. Therefore, output 506 includes Group-by values 516 and Sum values 518.

Figure 12:
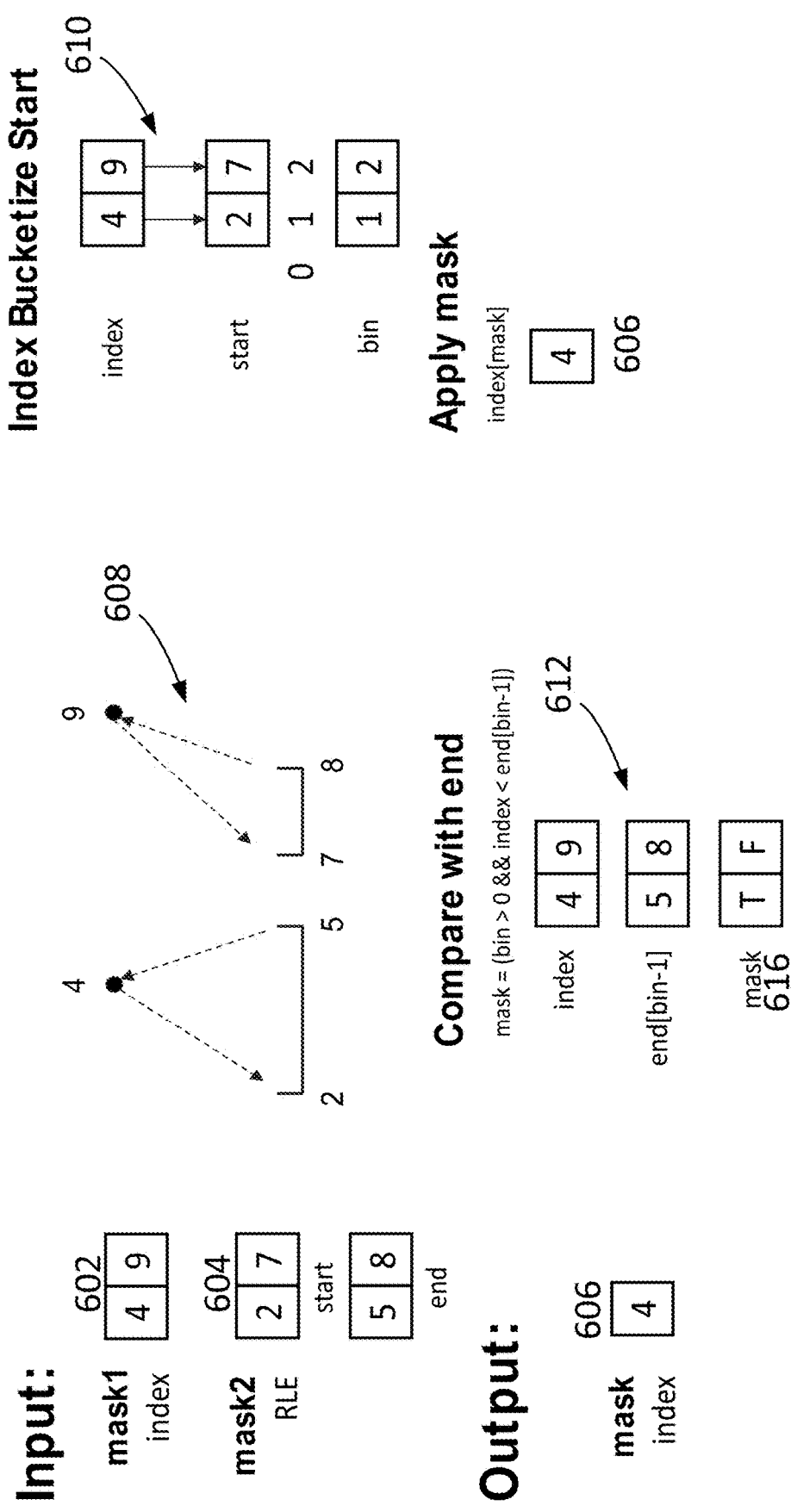
FIG. 12 is a depiction of execution of another AND function in accordance with an implementation of the disclosure.

FIG. 12 depicts an example of an AND operation between an index value 602 and an RLE data run value 604 to obtain an output mask 606. As shown, index input 602 includes values at position 4 and position 9. RLE input 604 includes a value at positions 2 through 5 and another value at positions 7 and 8. Diagram 8 is a graphical representation of inputs 602 and 604, showing the positions of the data values relative to each other. At a high level, it can be seen that index value "4" falls within the RLE position range 2-5 and index value "9" falls outside of RLE position range 7-8. At 610, the index positions 4 and 9 are compared to the RLE start positions 2 and 7 to determine which index positions are after the start positions. In this example, both index positions 4 and 9 fall after the RLE start positions 2 and 7. Therefore, both index values remain eligible to be included in the output mask. At 612, the index positions 4 and 9 are compared to the RLE end positions 5 and 8 to determine which index positions are before the end positions. In this example, index position 4 falls before RLE end position 5, but index position 9 falls after RLE end position 8. Based on operations 610 and 612, a mask 616 is generated, in which the value corresponding to index position 4 is True ("T") and the value corresponding to index position 9 is False ("F"). When mask 616 is applied to the index value 602, the resulting output 606 is the position 4.

As described above, implementations of the present disclosure include systems and processes for performing query operations by a parallel processing computing system, such as a GPU, on run length encoded data without first decompressing the data. Since the size of the data being processed is reduced due to the compression, the operations can be made more efficient, and the computing system is able to process more data with lower latency. While specific examples of operations have been described in detail, it will be understood that many other query operations are able to be performed on RLE data in a similar fashion, without decompressing the RLE data prior to processing. Examples of such operations include, but are not limited to, NOT, comparison operators, arithmetic operators, grouping operators, aggregating operators, set operators, including but not limited to, intersection, union, membership, complement, and distinct, join operators, including but not limited to many-to-many joins, optimizations for one-to-many joins, and many-to-one joins.

Figure 13:
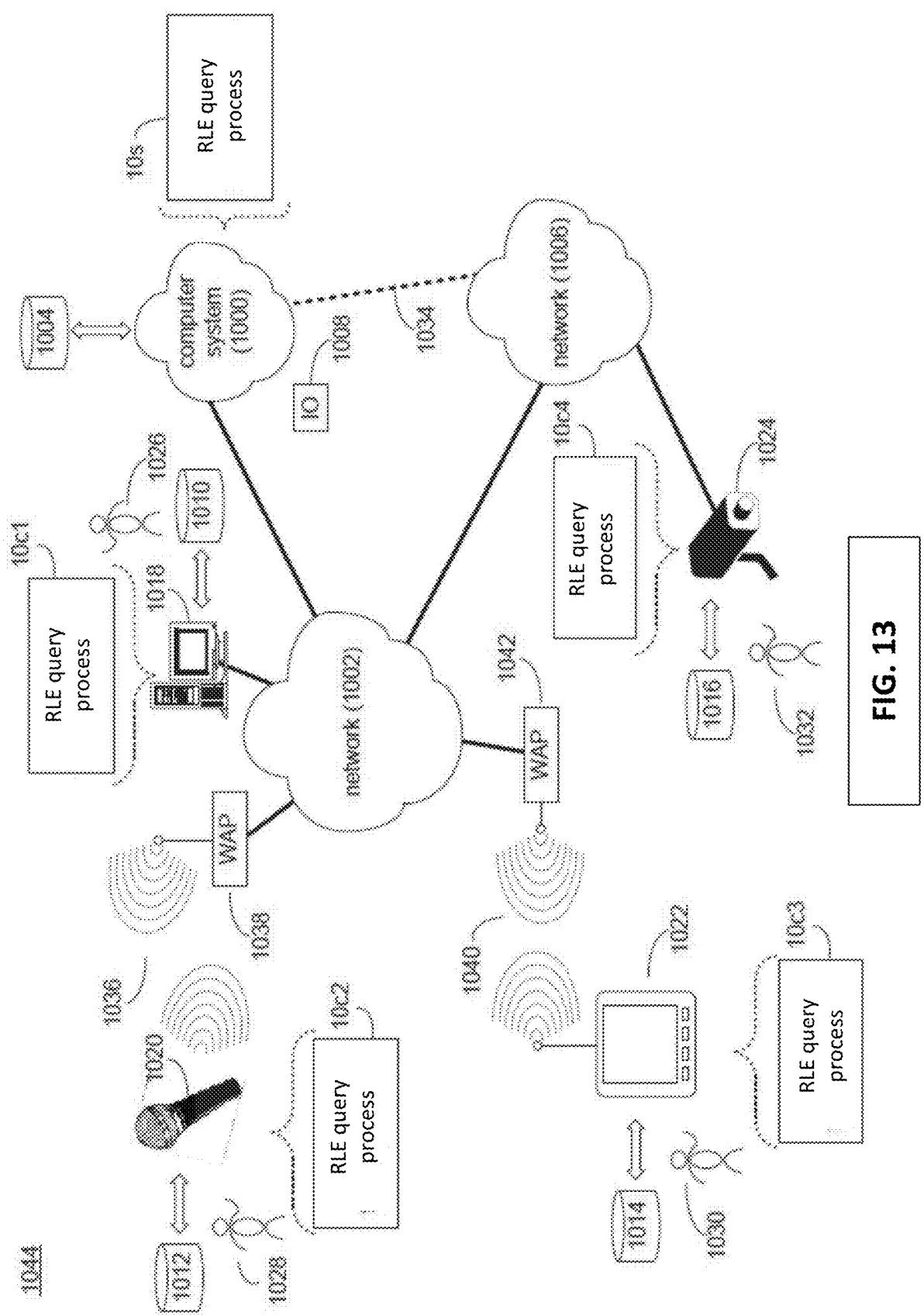
FIG. 13 is a diagrammatic view of a computer system and the audio signal disentanglement process coupled to a distributed computing network.

System Overview:

Referring to FIG. 13, there is shown an RLE query process 10. RLE query process 10 may be implemented as a server-side process, a client-side process, or a hybrid server-side/client-side process. For example, RLE query process 10 may be implemented as a purely server-side process via computational cost reduction process 10*s*. Alternatively, RLE query process 10 may be implemented as a purely client-side process via one or more of RLE query process 10*c*1, RLE query process 10*c*2, RLE query process 10*c*3, and RLE query process 10*c*4. Alternatively still, RLE query process 10 may be implemented as a hybrid server-side/client-side process via RLE query process 10*s* in combination with one or more of RLE query process 10*c*1, RLE query process 10*c*2, RLE query process 10*c*3, and RLE query process 10*c*4.

Accordingly, RLE query process 10 as used in this disclosure may include any combination of RLE query process 10*s*, RLE query process 10*c*1, RLE query process 10*c*2, RLE query process 10*c*3, and RLE query process 10*c*4.

RLE query process 10*s* may be a server application and may reside on and may be executed by a computer system 1000, which may be connected to network 1002 (e.g., the Internet or a local area network). Computer system 1000 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a minicomputer, a mainframe computer, a RAID device and a NAS system. The various components of computer system 1000 may execute one or more operating systems.

The instruction sets and subroutines of computational cost reduction process 10*s*, which may be stored on storage device 1004 coupled to computer system 1000, may be executed by one or more processors (not shown) and one or more memory architectures (not shown) included within computer system 1000. Examples of storage device 1004 may include but are not limited to: a hard disk drive; a RAID device; a random-access memory (RAM); a read-only memory (ROM); and all forms of flash memory storage devices.

Network 1002 may be connected to one or more secondary networks (e.g., network 1004), examples of which may include but are not limited to: a local area network; a wide area network; or an intranet, for example.

Various IO requests (e.g., IO request 1008) may be sent from RLE query process 10*s*, RLE query process 10*c*1, RLE query process 10*c*2, RLE query process 10*c*3 and/or RLE query process 10*c*4 to computer system 1000. Examples of IO request 1008 may include but are not limited to data write requests (i.e., a request that content be written to computer system 1000) and data read requests (i.e., a request that content be read from computer system 1000).

The instruction sets and subroutines of RLE query process 10*c*1, RLE query process 10*c*2, RLE query process 10*c*3 and/or computational cost reduction process 10*c*4, which may be stored on storage devices 1010, 1012, 1014, 1016 (respectively) coupled to client electronic devices 1018, 1020, 1022, 1024 (respectively), may be executed by one or more processors (not shown) and one or more memory architectures (not shown) incorporated into client electronic devices 1018, 1020, 1022, 1024 (respectively). Storage devices 1010, 1012, 1014, 1016 may include but are not limited to: hard disk drives; optical drives; RAID devices; random access memories (RAM); read-only memories (ROM), and all forms of flash memory storage devices. Examples of client electronic devices 1018, 1020, 1022, 1024 may include, but are not limited to, personal computing device 1018 (e.g., a smart phone, a personal digital assistant, a laptop computer, a notebook computer, and a desktop computer), audio input device 1020 (e.g., a handheld microphone, a lapel microphone, an embedded microphone (such as those embedded within eyeglasses, smart phones, tablet computers and/or watches) and an audio recording device), display device 1022 (e.g., a tablet computer, a computer monitor, and a smart television), a hybrid device (e.g., a single device that includes the functionality of one or more of the above-references devices; not shown), an audio rendering device (e.g., a speaker system, a headphone system, or an earbud system; not shown), and a dedicated network device (not shown).

Users 1026, 1028, 1030, 1032 may access computer system 1000 directly through network 1002 or through secondary network 1006. Further, computer system 1000 may be connected to network 1002 through secondary network 1006, as illustrated with link line 1034.

The various client electronic devices (e.g., client electronic devices 1018, 1020, 1022, 1024) may be directly or indirectly coupled to network 1002 (or network 1006). For example, personal computing device 1018 is shown directly coupled to network 1002 via a hardwired network connection. Further, machine vision input device 1024 is shown directly coupled to network 1006 via a hardwired network connection. Audio input device 1022 is shown wirelessly coupled to network 1002 via wireless communication channel 1036 established between audio input device 1020 and wireless access point (i.e., WAP) 1038, which is shown directly coupled to network 1002. WAP 1038 may be, for example, an IEEE 802.11a. 802.11b, 802.11g. 802.11n, Wi-Fi, and/or any device that is capable of establishing wireless communication channel 1036 between audio input device 1020 and WAP 1038. Display device 1022 is shown wirelessly coupled to network 1002 via wireless communication channel 1040 established between display device 1022 and WAP 1042, which is shown directly coupled to network 1002.

The various client electronic devices (e.g., client electronic devices 1018, 1020, 1022, 1024) may each execute an operating system, wherein the combination of the various client electronic devices (e.g., client electronic devices 1018, 1020, 1022, 1024) and computer system 1000 may form modular system 1044.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving data for query execution at a parallel processing computing system;
   determining that at least a portion of the data is compressed according to run length encoding (RLE), thereby forming RLE data; and
   executing a query operation on the RLE data without performing a decoding operation on the RLE data,
   wherein the query operation includes a plurality of parameters, at least one parameter being the RLE data and at least one parameter being in one of an index format, a plain format, and a RLE hybrid format.

2. The computer-implemented method of claim 1, wherein the query operation includes a logical AND function.

3. The computer-implemented method of claim 1, wherein the query operation includes a logical OR function.

4. The computer-implemented method of claim 1, wherein the query operation includes a group-by function.

5. The computer-implemented method of claim 2, wherein the query operation includes a plurality of parameters, at least 2 parameters being compressed using RLE to generate at least 2 RLE parameters.

6. The computer-implemented method of claim 5, further including determining a range intersection between the at least 2 RLE parameters.

7. A computing system comprising:
   a memory; and
   a processor to:
      order data tables to optimize encoding the data according to run length encoding (RLE);
      convert at least one data column in a data table into RLE data;
      receive an SQL query operation at a parallel processing computing device;
      execute the SQL query operation on the RLE data in its compressed state; and
      output a result of the execution of the SQL query operation,
      wherein the SQL query operation includes a plurality of parameters, at least one parameter being the RLE data and at least one parameter being in one of an index format, a plain format, and a RLE hybrid format.

8. The computing system of claim 7, wherein the SQL query operation includes a logical AND function.

9. The computing system of claim 7, wherein the SQL query operation includes a logical OR function.

10. The computing system of claim 7, wherein the SQL query operation includes a group-by function.

11. The computing system of claim 8, wherein the SQL query operation includes a plurality of parameters, at least 2 parameters being compressed using RLE to generate at least 2 RLE parameters.

12. The computing system of claim 11, further including determining a range intersection between the at least 2 RLE parameters.

13. A computer program product residing on a non-transitory computer readable medium having a plurality of instructions stored thereon which, when executed by a processor, cause the processor to perform operations comprising:
   receiving data for query execution at a parallel processing computing system, at least a portion of the data being compressed according to run length encoding (RLE), thereby forming RLE data; and
   executing a query operation on the RLE data without performing a decompression operation on the RLE data,
   wherein the query operation includes a plurality of parameters, at least one parameter being the RLE data and at least one parameter being in one of an index format, a plain format, and a RLE hybrid format.

14. The computer program product of claim 13, wherein the parallel processing computing system comprises a graphics processing unit (GPU).

15. The computer program product of claim 13, wherein the query operation includes a logical AND function.

16. The computing system of claim 13, wherein the query operation includes a logical OR function.

17. The computing system of claim 13, wherein the query operation includes a group-by function.

* * * * *